US012306582B2

(12) United States Patent
Nagayama et al.

(10) Patent No.: US 12,306,582 B2
(45) Date of Patent: *May 20, 2025

(54) CARRIER FOR FORMING ELECTROPHOTOGRAPHIC IMAGE, DEVELOPER FOR FORMING ELECTROPHOTOGRAPHIC IMAGE, ELECTROPHOTOGRAPHIC IMAGE FORMING METHOD, ELECTROPHOTOGRAPHIC IMAGE FORMING APPARATUS, AND PROCESS CARTRIDGE

(71) Applicants: Masashi Nagayama, Shizuoka (JP); Kousuke Suzuki, Shizuoka (JP); Masahiro Seki, Nara (JP); Hiroyuki Kishida, Shizuoka (JP); Namie Suzuki, Shizuoka (JP)

(72) Inventors: Masashi Nagayama, Shizuoka (JP); Kousuke Suzuki, Shizuoka (JP); Masahiro Seki, Nara (JP); Hiroyuki Kishida, Shizuoka (JP); Namie Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 546 days.

This patent is subject to a terminal disclaimer.

(21) Appl. No.: 17/753,784

(22) PCT Filed: Nov. 12, 2020

(86) PCT No.: PCT/IB2020/060633

§ 371 (c)(1),
(2) Date: Mar. 15, 2022

(87) PCT Pub. No.: WO2021/094957

PCT Pub. Date: May 20, 2021

(65) Prior Publication Data

US 2022/0283523 A1 Sep. 8, 2022

(30) Foreign Application Priority Data

Nov. 15, 2019 (JP) ................................ 2019-207223

(51) Int. Cl.
*G03G 9/113* (2006.01)
*G03G 9/107* (2006.01)
*G03G 15/08* (2006.01)

(52) U.S. Cl.
CPC ......... *G03G 9/1139* (2013.01); *G03G 9/1085* (2020.08); *G03G 15/0808* (2013.01)

(58) Field of Classification Search
CPC ............... G03G 9/1139; G03G 9/1085; G03G 15/0808; G03G 9/108; G03G 9/1131; G03G 9/10
See application file for complete search history.

(56) References Cited

U.S. PATENT DOCUMENTS

2006/0269862 A1* 11/2006 Kobayashi ........... G03G 9/0833 430/111.41
2007/0048650 A1 3/2007 Inoue et al.
(Continued)

FOREIGN PATENT DOCUMENTS

CN 104603695 A 5/2015
EP 0 977 094 A1 2/2000
(Continued)

OTHER PUBLICATIONS

Japanese Office Action dated Jun. 28, 2023, in Japanese Patent Application No. 2019-207223, 2 pages.
(Continued)

*Primary Examiner* — Stewart A Fraser
(74) *Attorney, Agent, or Firm* — Grüneberg and Myers PLLC

(57) ABSTRACT

A carrier can be used for forming an electrophotographic image. The carrier contains a core particle and a coating
(Continued)

layer coating the core particle. The coating layer contains a chargeable particle. The carder has an internal void ratio of 0.0% or greater but less than 2.0%, and an apparent density of 2.0 g/$cm^3$ or greater but less than 2.5 g/$cm^3$.

15 Claims, 1 Drawing Sheet

(56) References Cited

U.S. PATENT DOCUMENTS

| | | | | |
|---|---|---|---|---|
| 2011/0171573 | A1 | 7/2011 | Sakata et al. | |
| 2011/0217643 | A1 * | 9/2011 | Ishizuka | G03G 9/09725 430/105 |
| 2015/0078788 | A1 | 3/2015 | Koike et al. | |
| 2015/0153665 | A1 | 6/2015 | Kishida et al. | |
| 2017/0153563 | A1 | 6/2017 | Kishida et al. | |
| 2017/0185000 | A1 | 6/2017 | Nagayama et al. | |
| 2017/0205721 | A1 | 7/2017 | Murasawa et al. | |
| 2017/0227869 | A1 | 8/2017 | Kadokura et al. | |
| 2017/0248871 | A1 | 8/2017 | Iwatsuki et al. | |
| 2017/0269497 | A1 | 9/2017 | Murasawa et al. | |
| 2017/0329247 | A1 | 11/2017 | Murasawa et al. | |
| 2018/0113393 | A1 * | 4/2018 | Seki | G03G 9/1139 |
| 2018/0120724 | A1 * | 5/2018 | Sakata | G03G 9/1137 |
| 2018/0267421 | A1 | 9/2018 | Mariko et al. | |
| 2019/0018331 | A1 | 1/2019 | Takii et al. | |
| 2020/0166867 | A1 | 5/2020 | Nagayama et al. | |
| 2020/0183297 | A1 | 6/2020 | Murata et al. | |
| 2022/0291603 | A1 * | 9/2022 | Kishida | G03G 9/1075 |

FOREIGN PATENT DOCUMENTS

| | | |
|---|---|---|
| EP | 1 729 180 A1 | 12/2006 |
| JP | 54-155048 | 12/1979 |
| JP | 56-075659 | 6/1981 |
| JP | 57-040267 | 3/1982 |
| JP | 57-168255 | 10/1982 |
| JP | 58-108548 | 6/1983 |
| JP | 58-108549 | 6/1983 |
| JP | 58-117555 | 7/1983 |
| JP | 59-166968 | 9/1984 |
| JP | 2-079862 | 3/1990 |
| JP | 4-360156 | 12/1992 |
| JP | 5-273789 | 10/1993 |
| JP | 5-303238 | 11/1993 |
| JP | 6-202381 | 7/1994 |
| JP | 8-006307 | 1/1996 |
| JP | 11-174740 | 7/1999 |
| JP | 2006-079022 | 3/2006 |
| JP | 2006-337579 | 12/2006 |
| JP | 2007-58124 | 3/2007 |
| JP | 2010-117519 | 5/2010 |
| JP | 2011-145397 | 7/2011 |
| JP | 2011-209678 | 10/2011 |
| JP | 2012-22156 | 2/2012 |
| JP | 2014-170103 | 9/2014 |
| JP | 2015-055864 | 3/2015 |
| JP | 2016-80991 | 5/2016 |
| JP | 2016-212254 | 12/2016 |

OTHER PUBLICATIONS

International Search Report issued on Feb. 10, 2021 in PCT/IB2020/060633 filed on Nov. 12, 2020.

Office Action received for Chinese Patent Application No. 202080077902.9, mailed on Mar. 21, 2025, 12 pages with English translation.

* cited by examiner

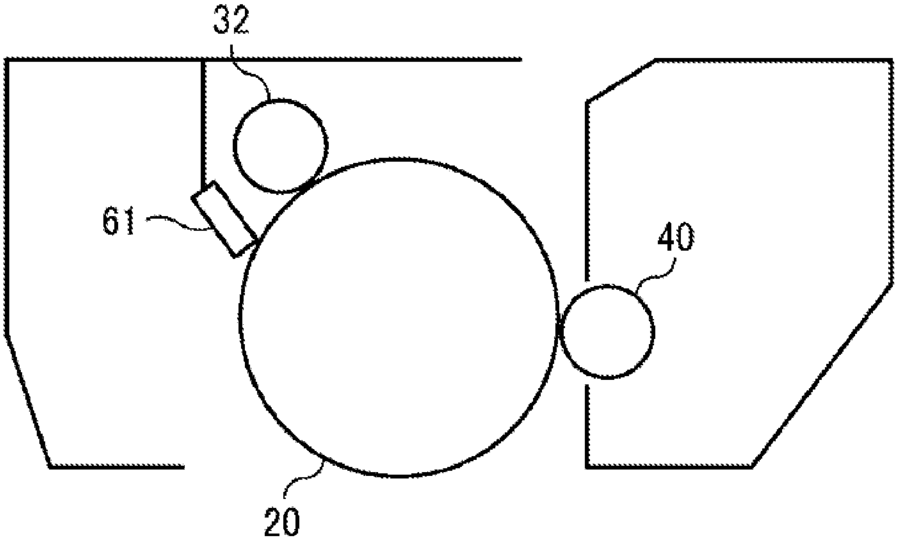
32
61
40
20

CARRIER FOR FORMING ELECTROPHOTOGRAPHIC IMAGE, DEVELOPER FOR FORMING ELECTROPHOTOGRAPHIC IMAGE, ELECTROPHOTOGRAPHIC IMAGE FORMING METHOD, ELECTROPHOTOGRAPHIC IMAGE FORMING APPARATUS, AND PROCESS CARTRIDGE

CROSS-REFERENCE TO RELATED APPLICATIONS

This application is the National Stage entry under § 371 of International Application No. PCT/IB2020/060633, filed on Nov. 12, 2020, and which claims the benefit of priority to Japanese Application No. 2019-207223, filed on Nov. 15, 2019. The content of each of these applications is hereby incorporated by reference in its entirety.

BACKGROUND OF THE INVENTION

Technical Field

The present disclosure relates to a carrier for forming an electrophotographic image, a developer for forming an electrophotographic image, an electrophotographic image forming method, an electrophotographic image forming apparatus, and a process cartridge

Description of Related Art

Generally, in image forming methods such as electrophotography and electrostatic photography, a developer obtained by mixing a toner and a carrier is used to develop an electrostatic latent image formed on a latent image bearer. The developer is required to be an appropriately charged mixture. As a method for developing an electrostatic latent image, a method using a two-component developer obtained by mixing a toner and a carrier (hereinafter "two-component development system") and another method using a one-component developer free of carrier (hereinafter "one-component development system") are known. The two-component development system is advantageous over the one-component development system in maintaining high image quality over an extended period of time because the carrier provides a wide area for triboelectrically charging the toner and has stable chargeability. The two-component development system is often used particularly in high-speed machines since the capability of supplying toner to the developing region is high. In addition, due to the above-described advantages, the two-component development system is widely employed in digital electrophotographic systems that visualize an electrostatic latent image formed on a photoconductor with a laser beam.

Various attempts have been made to increase the durability of carriers used in such two-component development systems. For example, there has been an attempt to coating a carrier with an appropriate resin material for the purpose of preventing spent toner from adhering to the surface of the carrier, forming a uniform surface on the carrier, preventing oxidation of the surface, preventing a decrease in moisture sensitivity, extending the lifespan of the developer, protecting the photoconductor from scratch or abrasion by the carrier, controlling the charge polarity, or adjusting the charge amount. For example, a carrier coated with a specific resin material (PTL 1), carriers in which various additives are added to the coating layer (PTL 2 to PTL 8), and a carrier in which additives are attached to the carrier surface (PTL 9) have been proposed. As another example, a carrier coated with a carrier coating material composed of a guanamine resin and a thermosetting resin capable of cross-linking with the guanamine resin has been proposed in PTL 10. A carrier coated with a carrier coating material composed of a cross-linked product of a melamine resin and an acrylic resin has also been proposed in PTL 11.

Resin-coated carrier in which a conductive carbon and/or conductive filler as a conducting agent is dispersed in the carrier coating layer have also been proposed in PTL 12 to PTL 15. Further, PTL 16 discloses a carrier having a coating layer containing a first conductive particle that is a metal oxide conductive particle and a second conductive particle that is a metal oxide particle and/or a metal salt particle whose surface is conductively treated. As another example, PTL 17 and PTL 18 disclose carriers containing barium sulfate in a coating film in which the ratio Ba/Si with respect to all elements measured by XPS is from 0.01 to 0.08. PTL 19 describes an example in which barium sulfate is used as a base material. PTL 20 has considered that the cause of generation of ghost images is a developing potential rise caused due to a phenomenon called "sleeve contamination" in which toner gets adhered to a developer bearer (e.g., developing sleeve) when the developer bearer passes through a developing region facing a non-image portion on a latent image bearer. PTL 20 has proposed, in attempting to suppress the occurrence of sleeve contamination and avoid the generation of ghost images, a developing device in which the coefficient of friction of the surface layer of the developer bearer is lowered to adjust the alternating current component of the voltage applied to the developer bearer.

CITATION LIST

Patent Literature

[PTL 1]
JP-S58-108548-A
[PTL 2]
JP-S54-155048-A
[PTL 3]
JP-S57-40267-A
[PTL 4]
JP-S58-108549-A
[PTL 5]
JP-S59-166968-A
[PTL 6]
JP-H01-19584-B
[PTL 7]
JP-H03-628-B
[PTL 8]
JP-H06-202381-A
[PTL 9]
JP-H05-273789-A
[PTL 10]
JP-H08-6307-A
[PTL 11]
JP-2683624-B
[PTL 12]
JP-S56-75659-A
[PTL 13]
JP-H04-360156-A
[PTL 14]
JP-H05-303238-A

[PTL 15]
JP-H011-174740-A
[PTL 16]
JP-2010-117519-A
[PTL 17]
JP-5534409-B
[PTL 18]
JP-2011-209678-A
[PTL 19]
JP-2006-079022-A
[PTL 20]
JP-6222553-B

SUMMARY OF INVENTION

Technical Problem

An object of the present invention is to provide a carrier for forming an electrophotographic image that has carrier deposition resistance (i.e., an ability not to cause carrier deposition) and ghost resistance (i.e., an ability not to cause ghost images) while maintaining a stable charging ability for an extended period of time.

Solution to Problem

The above-described problems can be solved by the following embodiment 1).

1) A carrier for forming an electrophotographic image, comprising a core particle and a coating layer coating the core particle, wherein the carrier has an internal void ratio of 0.0% or greater but less than 2.0% and an apparent density of 2.0 $g/cm^3$ or greater but less than 2.5 $g/cm^3$, and the coating layer contains a chargeable particle.

Advantageous Effects of Invention

In accordance with some embodiments of the present invention, a carrier for forming an electrophotographic image is provided that has carrier deposition resistance (i.e., an ability not to cause carrier deposition) and ghost resistance (i.e., an ability not to cause ghost images) while maintaining a stable charging ability for an extended period of time.

BRIEF DESCRIPTION OF DRAWINGS

The accompanying drawing is intended to depict example embodiments of the present invention and should not be interpreted to limit the scope thereof. The accompanying drawing is not to be considered as drawn to scale unless explicitly noted. Also, identical or similar reference numerals designate identical or similar components throughout the several views.

The FIGURE is a schematic diagram illustrating a process cartridge according to an embodiment of the present invention.

DESCRIPTION OF EMBODIMENTS

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention are described in detail below.

The present invention can be achieved by, in addition to the above-described embodiment 1), the following embodiments 2) to 11).

2) The carrier of 1) above, wherein the chargeable particle comprises at least one member selected from the group consisting of barium sulfate, zinc oxide, magnesium oxide, magnesium hydroxide, and hydrotalcite.

With the embodiment 2), since the chargeable particle well exhibits positive chargeability, the carrier for forming an electrophotographic image is provided that efficiently and reliably gives charge to negatively-chargeable toner for an extended period of time.

3) The carrier of 1) or 2) above, wherein the chargeable particle comprises barium sulfate, and an amount of barium exposed at a surface of the coating layer is 0.1% by atom or greater.

With the embodiment 3), since the highly-efficient chargeable particle is located on the carrier surface that contributes most to charging, the carrier for forming an electrophotographic image is provided that more effectively exhibits charging ability.

4) The carrier of any of 1) to 3) above, wherein the core particle comprises manganese ferrite (hereinafter “Mn ferrite”).

With the embodiment 4), since the magnetization of the core particle is high, the carrier for forming an electrophotographic image is provided that has improved carrier deposition resistance.

5) The carrier of any of 1) to 4) above, wherein the core particle has a surface roughness Rz of 2.0 μm or greater but less than 3.0 μm.

With the embodiment 5), it is easy to keep the apparent density of the carrier low even when the number of internal voids is small, and therefore the carrier for forming an electrophotographic image is provided that has both improved carrier deposition resistance and improved ghost resistance.

6) The carrier of any of 1) to 5) above, wherein the carrier has a magnetization of 56 $Am^2/kg$ or greater but less than 73 $Am^2/kg$ in a magnetic field of 1,000 Oe that is equal to 79.58 kA/m.

With the embodiment 6), the carrier for forming an electrophotographic image is provided that has high carrier deposition resistance, suppresses the generation of abnormal images due to carry-over of developer on the developer bearer, and is excellent in maintaining the charging ability for an extended period of time.

7) The carrier of any of 1) to 6) above, wherein the coating layer further contains an inorganic particle other than the chargeable particle, wherein the inorganic particle comprises at least one member selected from the group consisting of: a particle of a doped tin oxide doped with at least one member selected from the group consisting of tungsten, indium, phosphorus, tungsten oxides, indium oxides, and phosphorus oxides; and a particle comprising a base particle and the doped tin oxide on a surface of the base particle.

With the embodiment 7), even when the coating layer is gradually scraped off over a long-term use and the inorganic particle serving as a resistance adjusting agent is detached from the carrier surface, the occurrence of toner color contamination is prevented for low coloring of the inorganic particle.

8) A developer for forming an electrophotographic image comprising the carrier of any one of 1) to 7) above.

With the embodiment 8), the developer for developing an electrostatic latent image using the carrier according to an embodiment of the present invention is provided that has excellent carrier deposition resistance and ghost resistance.

9) An electrophotographic image forming method for forming an image using the developer of 8) above.

With the embodiment 9), the carrier and developer according to some embodiments of the present invention are capable of forming an image with providing excellent carrier deposition resistance and ghost resistance.

10) An electrophotographic image forming apparatus containing the developer of 8) above.

With the embodiment 10), the apparatus for forming an image with the carrier and developer according to some embodiments of the present invention is provided with providing excellent carrier deposition resistance and ghost resistance.

11) A process cartridge containing the developer of 8) above.

With the embodiment 11), the detachably mountable process cartridge is capable of forming an image with the carrier and developer according to some embodiments of the present invention with providing excellent carrier deposition resistance and ghost resistance.

The inventors of the present invention have made diligent studies to solve the above-described problems.

As a result, they have found that the above-described problems can be solved by a carrier for forming an electrophotographic image (hereinafter simply "carrier") comprising a core particle and a coating layer coating the core particle, when the internal void ratio thereof is 0.0% or greater but less than 2.0%, the apparent density thereof is 2.0 g/cm$^3$ or greater but less than 2.5 g/cm$^3$, and the coating layer contains a chargeable particle.

As described above, when the carrier contains a chargeable particle in the coating layer, the carrier is suppressed from lowering its charging ability during supply and consumption of toner over a high image area, due to the charge-imparting function of the chargeable particle. However, since the magnetic moment of one carrier particle is small and the magnetic binding force received from the developer bearer is low, there is a drawback that the carrier deposition resistance is low.

The magnetic moment of the carrier mostly depends on the magnetization of the core particle (hereinafter, sometimes referred to as the "core material"). The magnetization itself is determined by the composition of the core material. Therefore, in order to increase the magnetic moment per core particle to compensate a magnetic moment decrease caused by the chargeable particle, it is effective to increase the mass per core particle as much as possible. On the other hand, as described above, ghost images are generated by a developing potential rise caused due to sleeve contamination. However, even in a case where the same degree of sleeve contamination is caused, carriers with a lower apparent density are more capable of reducing the degree of ghost images. This is because the lower the apparent density of the carrier, the higher the space occupancy of the carrier in the developing region (that is the space between the latent image bearer and the developing sleeve), and the lower the electrical resistance of the bulk carrier. It is considered that, when the electrical resistance of the bulk carrier is low, the mirror image charge easily moves in the carrier in the direction of canceling the potential raised by sleeve contamination, so that the potential rise is alleviated and generation of ghost images is suppressed. In other words, generation of ghost image is more likely to be caused when the apparent density of the carrier is increased.

One of the factors that determines the apparent density of the bulk carrier is the mass of one carrier particle. Since the apparent density of the bulk carrier tends to increase as the mass of one carrier particle increases, it is difficult to keep the apparent density of the bulk carrier low while increasing the mass of one carrier particle. Therefore, there is a trade-off between carrier deposition resistance and ghost resistance, and it has been difficult to achieve both carrier deposition resistance and ghost resistance at high levels.

The inventors of the present invention have made extensive studies on this issue and found that, even in the case of a carrier whose magnetic moment tends to low due to inclusion of a chargeable particle in the coating layer, it is effective to reduce the internal void ratio of the core material to less than 2.0%, in order to efficiently increase the magnetic moment of one carrier particle by maximizing the mass of one carrier particle while minimizing an increase of the apparent density.

It was also found that, even in the case of a carrier using such a core material, generation of ghost images can be suppressed by reducing the apparent density of the carrier to less than 2.5 g/cm$^3$.

However, merely reducing the internal void ratio of the core material to less than 2.0% allows the apparent density of the carrier to increase. In particular, when ferrite particles whose magnetization is relatively high are used as the core material in order to gain the magnetic moment, it is difficult for the carrier to achieve an apparent density of less than 2.5 g/cm$^3$. The inventors of the present invention have studied to overcome this antinomy. As a result, the inventors have come to the conclusion that, even when the internal void ratio is reduced to less than 2.0%, the apparent density of the carrier can be reduced to less than 2.5 g/cm$^3$ and generation of ghost images can be suppressed by controlling the apparent density of the carrier using other factors that do not impair the mass of one carrier particle. For example, when the surface roughness of the carrier is increased, the apparent density can be reduced without impairing the mass of one carrier particle, and the apparent density of the carrier can be reduced to less than 2.5 g/cm$^3$ even when the internal void ratio is less than 2.0%, thus achieving both carrier deposition resistance and ghost resistance at high levels.

For improving the effect of the present invention, the internal void ratio of the carrier is preferably 0.3% or greater but 1.9% or less, and/or the apparent density of the carrier is preferably 2.0 g/cm$^3$ or greater but 2.3 g/cm$^3$ or less.

The surface roughness of the carrier is greatly effected by the surface roughness of the core material. Among various surface roughness indexes, Rz (maximum height) has the greatest effect on the apparent density. As a result of studies by the inventors of the present invention, it has been found that the apparent density of the resultant carrier can be more efficiently reduced when the Rz of the core material is 2.0 μm or more. Further, when the Rz is less than 3.0 μm, projected and recessed portions on the surface of the core material are not too large, the projected portions of the core material is less likely to be exposed at the surface of the carrier during a long-term use of the carrier, and the lifespan of the carrier is unlikely to decrease. Therefore, the Rz is preferably 2.0 μm or greater but less than 3.0 μm. More preferably, the Rz is 2.1 μmn or greater but 2.9 μm or less.

The Rz of the core material refers to the maximum height Rz that is an index of surface profile (roughness profile) defined in Japanese Industrial Standards (JIS) B0601:2001 (1501365-1).

Since the carrier according to an embodiment of the present invention contains a chargeable particle in the coating layer, the carrier is suppressed from lowering its charging ability during supply and consumption of toner over a high image area due to the charge-imparting function of the chargeable particle, thereby suppressing the occurrence of abnormal phenomena such as toner scattering and background fouling caused by a charge decrease.

The chargeable particle here refers to a particle having a relatively low ionization potential, and more specifically, to a particle having the same ionization potential as an alumina particle (AA-03 manufactured by Sumitomo Chemical Co., Ltd.) or a particle having a lower ionization potential than the alumina particle. Preferred materials include barium sulfate, zinc oxide, magnesium oxide, magnesium hydroxide, and hydrotalcite, and particularly suitable materials include barium sulfate. The ionization potential is measured using PYS-202 manufactured by Sumitomo Heavy Industries, Ltd.

The proportion of the chargeable particle in the coating layer is preferably from 3% to 50% by mass, and more preferably from 6% to 27% by mass.

When barium sulfate is used as the chargeable particle, the amount of barium exposed at the surface of the coating layer is preferably 0.1% by atom or greater. Since charge exchange for charging the toner is performed on the surface layer of the coating layer, in the carrier with an appropriate exposure of barium sulfate to the surface of the coating layer, the charging ability of barium sulfate is greatly exerted even without a great scraping of the coating layer during a long-term use of the carrier. When the amount of barium exposed at the surface of the coating layer is 0.1% by atom or greater, the charging ability is exerted even not only when the coating layer has been scraped off but also when the spent toner components have adhered to the surface layer of the carrier after a long-term use. The amount of barium exposed at the surface of the coating layer is more preferably from 0.1% to 0.2% by atom.

The amount of exposure of barium sulfate at the surface layer of the carrier can be detected as the atomic percent of barium determined by a peak analysis by an instrument AXIS/ULTRA (manufactured by Shimadzu/KRATOS). The beam irradiation region of the instrument is approximately 900 μm×600 μm. The detection is performed at each of 17 beam irradiation regions in each of 25 carrier particles. The penetration depth is 0 to 10 nm. Information near the surface layer of the carrier is detected.

Specifically, the measurement is carried out by setting the measurement mode to A1: 1486.6 eV, the excitation source to monochrome (A1), the detection method to spectrum mode, and the magnet lens to OFF. First, the detected elements are identified by a wide scan, and then peaks for each detected element are detected by a narrow scan. After that, the atomic percent of barium with respect to all detected elements is calculated using the peak analysis software program attached to the instrument.

The particle diameter of the chargeable particle is not particularly limited. However, when the average thickness of the coating layer is T, the particle diameter h preferably satisfies the following formula. $h/2 \leq T \leq h$ By making the particle diameter of the chargeable particle larger than the thickness of the coating layer, it becomes more likely that the chargeable particle protrudes from the surface of the coating layer. When the top portion of the chargeable particle protrudes from the coating layer, it functions as a spacer between an object to be rubbed and the resin of the coating layer when the carrier particles are rubbed with each other or with an accommodating container wall or a conveyance jig, thus extending the lifespan of the coating layer. In addition, it becomes more likely that the chargeable particle comes into contact with the toner, which is preferable in terms of charge imparting function. Further, when the thickness T of the coating layer is larger than the half of the particle diameter of the chargeable particle, the chargeable particle is firmly captured in the coating layer, so that the chargeable particle becomes less likely to protrude from the coating layer.

The particle diameter of the chargeable particle can be measured by conventionally known methods. For example, prior to manufacture of the carrier, the particle diameter of the chargeable particle can be measured using NANOTRAC UPA series (manufactured by Nikkiso Co., Ltd.). As another example, after manufacture of the carrier, the particle diameter can be measured by cutting the coating layer on the carrier surface with a FIB (focused ion beam) and observing the cross-section by scanning electron microscopy (SEM) and/or energy-dispersive X-ray spectrometry (EDX). Another non-limiting example method is described below.

The carrier is mixed in an embedding resin (DEVCON available from ITW PP&F JAPAN Co., LTD, two-component mixture, 30-minute curable epoxy resin), left overnight or longer for curing, and mechanically polished to prepare a rough cross-section sample. The cross-section is finished using a cross-section polisher (SM-09010 manufactured by JEOL Ltd.) under an acceleration voltage of 5.0 kV and a beam current of 120 μA. The finished cross-section is photographed using a scanning electron microscope (MERLIN available from Carl Zeiss Co., Ltd.) under an accelerating voltage of 0.8 kV and a magnification of 30,000 times. The photographed image is incorporated into a TIFF (tagged image file format) image to measure the equivalent circle diameters of 100 barium sulfate particles using IMAGE-PRO PLUS available from Media Cybernetics, Inc., and the measured values are averaged. The measurement method is not limited to the above-described methods. The thickness of the coating layer can be measured from the photographed image in the same manner. Since each particle has an individual difference and the thickness of the coating layer varies depending on the location, not only one particle or one location is subjected to the measurement, but a statistically reliable number of particles or locations is subjected to the measurement.

The carrier according to an embodiment of the present invention has an internal void ratio of 0.0% or greater but less than 2.0%. As described above, when the internal void ratio is 2.0% or more, the loss of the magnetic moment per particle increases, and the carrier deposition resistance decreases.

The internal void ratio of the carrier can be measured as follows.

First, the carrier is cut, and a cross-section is photographed. Photographing of the cross-section can be performed by conventionally known methods such as SEM (scanning electron microscopy). Next, an area S of the contour of one particle is acquired from the photograph of the cross-section using a conventionally known image analysis software (for example, IMAGE PRO PREMIER available from Media Cybernetics, Inc.). Similarly, an area s of a void portion inside one particle is acquired, and the void ratio of one particle is calculated by the following formula.

$$\text{Void ratio of one particle [\%]}=(s/S)\times 100$$

This procedure is carried out for 60 randomly selected particles, and the average value is taken as the internal void ratio.

The carrier according to an embodiment of the present invention has an apparent density of 2.0 g/cm$^3$ or greater but less than 2.5 g/cm$^3$. As described above, when the apparent density of the carrier is 2.5 g/cm$^3$ or greater, the space occupancy of the carrier particles in the developing region becomes low when an image is developed from the developing roller to the image bearer. Therefore, it becomes difficult for electric charges to move in the developing region through the carrier, and it also becomes difficult to alleviate a potential rise caused due to the toner adhered to the developing sleeve, resulting in easy generation of ghost images. Further, when the apparent density is less than 2.0 g/cm$^3$, the magnetic moment is insufficient, resulting in poor carrier deposition resistance. The apparent density of carrier is measured according to JIS-Z2504:2000.

In addition, the inventors of the present invention have found that the charging ability is more effectively maintained during a long-term use when the chargeable particle is contained in the coating layer, the internal void ratio is less than 2.0%, and the apparent density is less than 2.5 g/cm$^3$, as in the carrier according to an embodiment of the present invention.

Although the detailed reason has not been clarified, the mechanism for this is considered as follows.

As described above, the charging ability of carrier decreases as the spent toner components accumulate on the surface of the carrier during a long-term use. In the case of a carrier having an apparent density of less than 2.5 g/cm$^3$ despite a low internal void ratio, that is, a carrier with large surface irregularities, the projected portions of the carrier function as claws that scrape off the spent components on the surface of the coating layer when the carrier particles rub against or collide with each other in the developing device.

However, if the weight of one carrier particle is small, the energy applied to the carrier particles at the time of rubbing and collision is small, so that the effect of scraping off the spent components by the projected portions is low. Therefore, when the internal void ratio is lowered to less than 2.0% and the weight per particle is increased as in the carrier according to an embodiment of the present invention, a large amount of energy is applied during scraping, so that the projected portions of the carrier become possible to effectively scrape off the spent components. As a result, accumulation of the spent components is suppressed, and a decrease of the charging ability is effectively suppressed.

The carrier according to an embodiment of the present invention contains the chargeable particle in the coating layer. The chargeable particle exerts its charging ability upon contact with toner particles. Since the chargeable particle is covered with, for example, a resin in the coating layer, it is necessary to expose the chargeable particle by damaging the resin that is covering the chargeable particle. The scraping performed by the carrier having projected portions and an appropriate weight per particle is capable of exposing the chargeable particle to develop the charging ability at an early stage and to continue to exert that ability for an extended period of time.

The core material used for the carrier according to an embodiment of the present invention can be appropriately selected from those known to be used for electrophotographic two-component carriers. In particular, Mn ferrite that is a material having a relatively high magnetization is preferred because it is easy to appropriately adjust the magnetic moment per carrier particle in view of carrier deposition resistance.

The carrier according to an embodiment of the present invention has a magnetization of preferably 56 Am$^2$/kg or greater but less than 73 Am$^2$/kg, more preferably 56 Am$^2$/kg or greater but 63 Am$^2$/kg or less, in a magnetic field of 1,000 Oe that is equal to 79.58 kA/m. Even when the internal void ratio is lowered to increase the mass per particle, the magnetic moment per particle does not decrease and carrier deposition is less likely to occur when the magnetization is 56 Am$^2$/kg or greater. Further, when the magnetization is 56 Am$^2$/kg or greater, not only carrier deposition is less likely to occur but also scraping off of the spent components is promoted because the carrier particles on the developer bearer are rubbed with a strong force, which is preferable for maintaining the charging ability of the carrier. When the magnetization of the carrier is less than 73 Am$^2$/kg, the magnetization is not too high, and it is not likely that the developer whose toner concentration has been lowered after image development enters the developing region again without separating from the developing roller. Therefore, the image density of the solid image after the second round of the developing roller is not decreased, and strip-like abnormal images are not likely to be generated.

In order to bring the magnetization of the carrier into the above-described range, the magnetization of the core material is preferably 66 Am$^2$/kg or greater but less than 75 Am$^2$/kg in a magnetic field of 1,000 Oe.

The magnetization is measured using a High Sensitivity Vibrating Sample Magnetometer (VSM-P7 manufactured by Toei Industry Co., Ltd.) of use for room temperature. In the measurement, an external magnetic field is continuously applied in the range of from 0 to 1,000 Oe for one cycle to measure a magnetization $\sigma$1000 in an external magnetic field of 1,000 Oe.

Preferably, the coating layer contains a conductive particle for the purpose of adjusting resistance. Conventionally, carbon black has been widely used as a conductive material. However, when used for a developer for a long term, the carbon black or a piece of resin containing the carbon black may be released from the coating layer of the carrier, due to friction or collision between carrier particles or between carrier particles and toner particles, and may be adhered to the toner particles or developed as it is. When the developer is that combined with a toner, especially yellow toner, white toner, or transparent toner, the problem of color turbidity (color contamination) remarkably appears. Therefore, it is preferable that the conductive particle be close to white or colorless as much as possible. Examples of materials having good color and conductive function include, but are not limited to, doped tin oxides that are doped with tungsten, indium, phosphorus, or an oxide of any of these substances. These doped tin oxides can be used as they are or provided to the surfaces of base particles. As the base particles, any known material can be used. Examples thereof include, but are not limited to, aluminum oxide and titanium oxide.

The coating layer may further contain a resin and other components as needed. The resin used for the coating layer may include a silicone resin, an acrylic resin, or a combination thereof. Acrylic resins have high adhesiveness and low brittleness and thereby exhibit superior wear resistance. At the same time, acrylic resins have a high surface energy. Therefore, when used in combination with a toner which easily cause adhesion, the adhered toner components may be accumulated on the acrylic resin to cause a decrease of the amount of charge. This problem can be solved by using a silicone resin in combination with the acrylic resin. This is because silicone resins have a low surface energy and therefore the toner components are less likely to adhere thereto, which prevents accumulation of the adhered toner components that causes detachment of the coating film. At the same time, silicone resins have low adhesiveness and high brittleness and thereby exhibit poor wear resistance. Thus, it is preferable that these two types or resins be used in a good balance to provide a coating layer having wear resistance to which toner is difficult to adhere. This is because silicone resins have a low surface energy and the toner components are less likely to adhere thereto, which prevents accumulation of the adhered toner components that causes detachment of the coating film.

In the present disclosure, silicone resins refer to all known silicone resins. Examples thereof include, but are not limited to, straight silicone resins consisting of organosiloxane bonds, and modified silicone resins (e.g., alkyd-modified, polyester-modified, epoxy-modified, acrylic-modified, and urethane-modified silicone resins). Specific examples of commercially-available products of the straight silicone resins include, but are not limited to, KR271, KR255, and KR152 (manufactured by Shin-Etsu Chemical Co., Ltd.) and SR2400, SR2406, and SR2410 (manufactured by Dow Corning Toray Silicone Co., Ltd.). Each of these silicone resins may be used alone or in combination with a cross-linkable component and/or a charge amount controlling agent. Specific examples of the modified silicone resins include, but are not limited to, commercially-available products such as KR206 (alkyd-modified), KR5208 (acrylic-modified), ES1001N (epoxy-modified), and KR305 (urethane-modified) (manufactured by Shin-Etsu Chemical Co., Ltd.); and SR2115 (epoxy-modified) and SR2110 (alkyd-modified) (manufactured by Dow Corning Toray Silicone Co., Ltd.).

Examples of the polycondensation catalysts include, but are not limited to, titanium-based catalysts, tin-based catalysts, zirconium-based catalysts, and aluminum-based catalysts. Among these catalysts, titanium-based catalysts are preferred for their excellent effects, and titanium diisopropoxybis(ethylacetoacetate) is most preferred. The reason for this is considered that this catalyst effectively accelerates condensation of silanol groups and is less likely to be deactivated.

In the present disclosure, acrylic resins refer to all known resins containing an acrylic component and are not particularly limited. Each of these acrylic resins may be used alone or in combination with at least one cross-linking component. Specific examples of the cross-linking component include, but are not limited to, amino resins and acidic catalysts. Specific examples of the amino resins include, but are not limited to, guanamine resin and melamine resin. The acidic catalysts here refer to all materials having a catalytic action. Specific examples thereof include, but are not limited to, those having a reactive group of a completely alkylated type, a methylol group type, an imino group type, or a methylol/imino group type.

More preferably, the coating layer contains a cross-linked product of an acrylic resin and an amino resin. In this case, the coating layers are prevented from fusing with each other while remaining the proper elasticity.

Examples of the amino resin include, but are not limited to, melamine resins and benzoguanamine resins, which can improve charge giving ability of the resulting carrier. To more properly control charge giving ability of the resulting carrier, a melamine resin and/or a benzoguanamine resin may be used in combination with another amino resin. Preferred examples of the acrylic resin that is cross-linkable with the amino resin include those having a hydroxyl group and/or a carboxyl group. Those having a hydroxy group are more preferred. In this case, adhesiveness to the core particle and conductive particle is more improved, and dispersion stability of the conductive particle is also improved. In this case, preferably, the acrylic resin has a hydroxyl value of 10 mgKOH/g or more, more preferably 20 mgKOH/g or more.

Preferably, a composition for forming the coating layer contains a silane coupling agent. In this case, the conductive particle can be reliably dispersed therein. Specific examples of the silane coupling agent include, but are not limited to, γ-(2-aminoethyl)aminopropyl trimethoxysilane, γ-(2-aminoethyl)aminopropylmethyl dimethoxysilane, γ-methacryloxypropyl trimethoxysilane, N-β-(N-vinylbenzylaminoethyl)-γ-aminopropyl trimethoxysilane hydrochloride, γ-glycidoxypropyl trimethoxysilane, γ-mercaptopropyl trimethoxysilane, methyl trimethoxysilane, methyl triethoxysilane, vinyl triacetoxysilane, γ-chloropropyl trimethoxysilane, hexamethyldisilazane, γ-anilinopropyl trimethoxysilane, vinyl trimethoxysilane, octadecyldimethyl[β-(trimethoxysilyl)propyl]ammonium chloride, γ-chloropropylmethyl dimethoxysilane, methyl trichlorosilane, dimethyl dichlorosilane, trimethyl chlorosilane, allyl triethoxysilane, 3-aminopropylmethyl diethoxysilane, 3-aminopropyl trimethoxysilane, dimethyl diethoxysilane, 1,3-divinyltetramethyl disilazane, and methacryloxyethyldimethyl(3-trimethoxysilylpropyl)ammonium chloride. Two or more of these materials can be used in combination.

Specific examples of commercially-available products of the silane coupling agents include, but are not limited to, AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (manufactured by Toray Silicone Co., Ltd.).

Preferably, the proportion of the silane coupling agent to the silicone resin is from 0.1% to 10% by mass. When the proportion of the silane coupling agent is less than 0.1% by mass, adhesion strength between the core particle/conductive particle and the silicone resin may be reduced to cause detachment of the coating layer during a long-term use. When the proportion exceeds 10% by mass, toner filming may occur in a long-term use.

The volume average particle diameter of the core particle of the carrier is not particularly limited. For preventing the occurrence of carrier deposition and carrier scattering, the volume average particle diameter is preferably 20 μm or more. For preventing the production of abnormal images (e.g., stripes made of carrier particles) and deterioration of image quality, the volume average particle diameter is preferably 100 μm or less. In particular, a core particle having a volume average particle diameter of from 20 to 60 μm can meet a recent demand for higher image quality. The volume average particle diameter can be measured using, for example, a particle size distribution analyzer MICROTRAC Model HRA9320-X100 (manufactured by Nikkiso Co., Ltd.).

The carrier according to an embodiment of the present invention may be manufactured by, for example, dissolving the resin, etc., in a solvent to prepare a coating liquid and uniformly coating the surface of the core particle with the coating liquid by a known coating method, followed by drying and baking. Examples of the coating method include, but are not limited to, a dipping method, a spraying method, and a brush coating method.

The solvent is not particularly limited and can be suitably selected to suit to a particular application. Specific examples thereof include, but are not limited to, toluene, xylene, methyl ethyl ketone, methyl isobutyl ketone, cellosolve, and butyl acetate.

The baking method is not particularly limited and can be suitably selected to suit to a particular application. Specific examples thereof include, but are not limited to, external heating methods and internal heating methods.

The baking instrument is not particularly limited and can be suitably selected to suit to a particular application. Specific examples thereof include, but are not limited to, stationary electric furnaces, fluxional electric furnaces, rotary electric furnaces, burner furnaces, and instruments equipped with microwave.

The average thickness of the coating layer is preferably 0.2 μm or greater but 1.0 μm or less, and more preferably 0.4 μm or greater but 0.8 μm or less.

Here, the average thickness of the coating layer can be measured by, for example, observing a cross-section of the carrier using a transmission electron microscope (TEM).

A developer according to an embodiment of the present invention contains the carrier according to an embodiment of the present invention. The developer may further contain a toner.

The toner may contain a binder resin, a colorant, a release agent, a charge controlling agent, an external additive, etc. The toner may be any of monochrome toner, color toner, white toner, transparent toner, or metallic luster toner. The toner may be manufactured by a conventionally known method such as a pulverization method and a polymerization method, or any other method.

In a typical pulverization method, toner materials are melt-kneaded, the melt-kneaded product is cooled and pulverized into particles, and the particles are classified by size, thus preparing mother particles. To more improve transferability and durability, an external additive is added to the mother particles, thus obtaining a toner.

Specific examples of the kneader for kneading the toner materials include, but are not limited to, a batch-type double roll mill; BANBURY MIXER; double-axis continuous extruders such as TWIN SCREW EXTRUDER KTK (manufactured by Kobe Steel, Ltd.), TWIN SCREW COMPOUNDER TEM (manufactured by Toshiba Machine Co., Ltd.), MIRACLE K.C.K (manufactured by Asada Iron Works Co., Ltd.), TWIN SCREW EXTRUDER PCM (manufactured by Ikegai Co., Ltd.), and KEX EXTRUDER (manufactured by Kurimoto, Ltd.); and single-axis continuous extruders such as KOKNEADER (manufactured by Buss Corporation).

The cooled melt-kneaded product may be coarsely pulverized by a HAMMER MILL or a ROTOPLEX and thereafter finely pulverized by a jet-type pulverizer or a mechanical pulverizer. Preferably, the pulverization is performed such that the resulting particles have an average particle diameter of from 3 to 15 μm.

When classifying the pulverized melt-kneaded product, a wind-power classifier may be used. Preferably, the classification is performed such that the resulting mother particles have an average particle diameter of from 5 to 20 μm.

The external additive is added to the mother particles by being stir-mixed therewith by a mixer, so that the external additive gets adhered to the surfaces of the mother particles while being pulverized.

Specific examples of the binder resin include, but are not limited to, homopolymers of styrene or styrene derivatives (e.g., polystyrene, poly-p-styrene, polyvinyl toluene), styrene-based copolymers (e.g., styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, styrene-maleate copolymer), polymethyl methacrylate, polybutyl methacrylate, polyvinyl chloride, polyvinyl acetate, polyethylene, polyester, polyurethane, epoxy resin, polyvinyl butyral, polyacrylic acid, rosin, modified rosin, terpene resin, phenol resin, aliphatic or aromatic hydrocarbon resin, and aromatic petroleum resin. Two or more of these resins can be used in combination.

Specific examples of usable binder resins for pressure fixing include, but are not limited to: polyolefins (e.g., low-molecular-weight polyethylene, low-molecular-weight polypropylene), olefin copolymers (e.g., ethylene-acrylic acid copolymer, ethylene-acrylate copolymer, styrene-methacrylic acid copolymer, ethylene-methacrylate copolymer, ethylene-vinyl chloride copolymer, ethylene-vinyl acetate copolymer, ionomer resin), epoxy resin, polyester resin, styrene-butadiene copolymer, polyvinyl pyrrolidone, methyl vinyl ether-maleic acid anhydride copolymer, maleic-acid-modified phenol resin, and phenol-modified terpene resin. Two or more of these resins can be used in combination.

Specific examples of usable colorants (i.e., pigments and dyes) include, but are not limited to, yellow pigments such as Cadmium Yellow, Mineral Fast Yellow, Nickel Titanium Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake; orange pigments such as Molybdenum Orange, Permanent Orange GTR, Pyrazolone Orange, Vulcan Orange, Indanthrene Brilliant Orange RK, Benzidine Orange G, and Indanthrene Brilliant Orange GK; red pigments such as Red Iron Oxide, Cadmium Red, Permanent Red 4R, Lithol Red, Pyrazolone Red, Watching Red calcium salt, Lake Red D, Brilliant Carmine 6B, Eosin Lake, Rhodamine Lake B, Alizarin Lake, and Brilliant Carmine 3B; violet pigments such as Fast Violet B and Methyl Violet Lake; blue pigments such as Cobalt Blue, Alkali Blue, Victoria Blue lake, Phthalocyanine Blue, Metal-free Phthalocyanine Blue, partial chlorination product of Phthalocyanine Blue, Fast Sky Blue, and Indanthrene Blue BC; green pigments such as Chrome Green, chromium oxide, Pigment Green B, and Malachite Green Lake; black pigments such as azine dyes (e.g., carbon black, oil furnace black, channel black, lamp black, acetylene black, aniline black), metal salt azo dyes, metal oxides, and combined metal oxides; and white pigments such as titanium oxide. Two or more of these colorants can be used in combination. The transparent toner may contain no colorant.

Specific examples of the release agent include, but are not limited to, polyolefins (e.g., polyethylene, polypropylene), fatty acid metal salts, fatty acid esters, paraffin waxes, amide waxes, polyvalent alcohol waxes, silicone varnishes, carnauba waxes, and ester waxes. Two or more of these materials can be used in combination.

The toner may further contain a charge controlling agent. Specific examples of the charge controlling agent include, but are not limited to: nigrosine; azine dyes having an alkyl group having 2 to 16 carbon atoms; basic dyes such as C. I. Basic Yellow 2 (C. I. 41000), C. I. Basic Yellow 3, C. I. Basic Red 1 (C. I. 45160), C. I. Basic Red 9 (C. I. 42500), C. I. Basic Violet 1 (C. I. 42535), C. I. Basic Violet 3 (C. I. 42555), C. I. Basic Violet 10 (C. I. 45170), C. I. Basic Violet 14 (C. I. 42510), C. I. Basic Blue 1 (C. I. 42025), C. I. Basic Blue 3 (C. I. 51005), C. I. Basic Blue 5 (C. I. 42140), C. I. Basic Blue 7 (C. I. 42595), C. I. Basic Blue 9 (C. I. 52015), C. I. Basic Blue 24 (C. I. 52030), C. I. Basic Blue 25 (C. I. 52025), C. I. Basic Blue 26 (C. I. 44045), C. I. Basic Green 1 (C. I. 42040), and C. I. Basic Green 4 (C. I. 42000); lake pigments of these basic dyes; quaternary ammonium salts such as C. I. Solvent Black 8 (C. I. 26150), benzoylmethylhexadecyl ammonium chloride, and decyltrimethyl chloride; dialkyl (e.g., dibutyl, dioctyl) tin compounds; dialkyl tin borate compounds; guanidine derivatives; polyamine resins such as vinyl polymers having amino group and condensed polymers having amino group; metal complex salts of monoazo dyes; metal complexes of salicylic acid, dialkyl salicylic acid, naphthoic acid, and dicarboxylic acid with Zn, Al, Co, Cr, and Fe; sulfonated copper phthalocyanine pigments; organic boron salts; fluorine-containing quaternary ammonium salts; and calixarene compounds. Two or more of these materials can be used in combination. For color toners other than black toner, metal salts of salicylic acid derivatives, which are white, are preferred.

Specific examples of the external additive include, but are not limited to, inorganic particles such as silica, titanium oxide, alumina, silicon carbide, silicon nitride, and boron nitride, and resin particles such as polymethyl methacrylate particles and polystyrene particles having an average particle diameter of from 0.05 to 1 μm, obtainable by soap-free emulsion polymerization. Two or more of these materials can be used in combination. Among these, metal oxide particles (e.g., silica, titanium oxide) whose surfaces are hydrophobized are preferred. When a hydrophobized silica and a hydrophobized titanium oxide are used in combination with the amount of the hydrophobized titanium oxide greater than that of the hydrophobized silica, the toner provides excellent charge stability regardless of humidity.

The electrophotographic image forming method according to an embodiment of the present invention forms an image using the developer according to an embodiment of the present invention. The electrophotographic image forming apparatus according to an embodiment of the present invention contains the developer according to an embodiment of the present invention.

Specifically, the electrophotographic image forming method according to an embodiment of the present invention includes the processes of: forming an electrostatic latent image on an electrostatic latent image bearer (including charging the electrostatic latent image bearer and irradiating the electrostatic latent image bearer to form the electrostatic latent image thereon); developing the electrostatic latent image formed on the electrostatic latent image bearer with the developer according to an embodiment of the present invention to form a toner image; transferring the toner image formed on the electrostatic latent image bearer onto a recording medium; and fixing the toner image on the recording medium. The method further includes other processes, as necessary.

The electrophotographic image forming apparatus according to an embodiment of the present invention includes: an electrostatic latent image bearer; a charger configured to charge the electrostatic latent image bearer; an irradiator configured to form an electrostatic latent image on the electrostatic latent image bearer; a developing device containing the developer according to an embodiment of the present invention, configured to develop the electrostatic latent image formed on the electrostatic latent image bearer with the developer to form a toner image; a transfer device configured to transfer the toner image formed on the electrostatic latent image bearer onto a recording medium; and a fixing device configured to fix the toner image on the recording medium. The image forming apparatus may further include other devices such as a neutralizer, a cleaner, a recycler, and a controller, as necessary.

The FIGURE is a schematic diagram illustrating a process cartridge according to an embodiment of the present invention. This process cartridge includes a photoconductor 20, a charger 32 in a proximity-type brush shape, a developing device 40 containing the developer according to an embodiment of the present invention, and a cleaner 61 having a cleaning blade, and is detachably mountable on an image forming apparatus body. These constituent elements are integrally combined to constitute the process cartridge. The process cartridge is configured to be detachably mountable on an image forming apparatus body such as a copier and a printer.

EXAMPLES

Hereinafter, the present invention is described in more detail with reference to Examples and Comparative Examples. However, the present invention is not limited to these Examples. In the following descriptions, "parts" represents "parts by mass" and "%" represents "% by mass" unless otherwise specified.

Preparation of Toner

Binder Resin Synthesis Example 1

In a reaction vessel equipped with a condenser tube, a stirrer, and a nitrogen introducing tube, 724 parts of ethylene oxide 2 mol adduct of bisphenol A, 276 parts of isophthalic acid, and 2 parts of dibutyltin oxide were allowed to react at 230 degrees C. for 8 hours under normal pressures and subsequently 5 hours under reduced pressures of from 10 to 15 mmHg. After reducing the temperature to 160 degrees C., 32 parts of phthalic anhydride were put in the vessel and allowed to react for 2 hours.

After being cooled to 80 degrees C., the vessel contents were further allowed to react with 188 parts of isophorone diisocyanate in ethyl acetate for 2 hours. Thus, an isocyanate-containing prepolymer (P1) was prepared.

Next, 267 parts of the prepolymer (P1) were allowed to react with 14 parts of isophoronediamine at 50 degrees C. for 2 hours. Thus, an urea-modified polyester (U1) having a weight average molecular weight of 64,000 was prepared.

In the same manner as described above, 724 parts of ethylene oxide 2 mol adduct of bisphenol A and 276 parts of terephthalic acid were allowed to polycondensate at 230 degrees C. for 8 hours under normal pressures and subsequently react for 5 hours under reduced pressures of from 10 to 15 mmHg. Thus, an unmodified polyester (E1) having a peak molecular weight of 5,000 was prepared.

Next, 200 parts of the urea-modified polyester (U1) and 800 parts of the unmodified polyester (E1) were dissolved in 2,000 parts of a mixed solvent of ethyl acetate/MEK (methyl ethyl ketone) (mixing ratio was 1/1). Thus, an ethyl acetate/MEK solution of a binder resin (B1) was prepared.

A part of the solution was dried under reduced pressures to isolate the binder resin (B1).

Master Batch Preparation Example 1

Pigment: C.I. Pigment Yellow 155: 40 parts
Binder resin: Polyester resin A: 60 parts
Water: 30 parts Polyester Resin A Synthesis Example Terephthalic acid: 60 parts
Dodecenyl succinic anhydride: 25 parts
Trimellitic anhydride: 15 parts
Bisphenol A (2,2) propylene oxide: 70 parts
Bisphenol A (2,2) ethylene oxide: 50 parts The above materials were put in a 1-liter four-necked round-bottom flask equipped with a thermometer, a stirrer, a condenser, and a nitrogen gas introducing tube. The flask was set in a mantle heater and charged with nitrogen gas through the nitrogen gas introducing tube. The flask was heated with an inert gas atmosphere maintained inside the flask. While the flask was kept at 200 degrees C., 0.05 g of dibutyltin oxide were added to the flask and allowed to react. Thus, a polyester resin A was obtained.

The above materials were mixed using a HENSCHEL MIXER to prepare a pigment aggregation into which water had permeated.

The pigment aggregation was kneaded by a double roll with its surface temperature set at 130 degrees C. for 45 minutes and then pulverized by a pulverizer into particles having a diameter of about 1 mm. Thus, a master batch (M1) was prepared.

Toner Production Example A

In a beaker, 240 parts of the ethyl acetate/MEK solution of the binder resin (B1), 20 parts of pentaerythritol tetrabehenate (having a melting point of 81 degrees C. and a melt viscosity of 25 cps), and 8 parts of the master batch (M1) were stirred with a TK HOMOMIXER at 12,000 rpm and 60 degrees C. for uniform dissolution and dispersion. Thus, a toner material liquid was prepared.

In another beaker, 706 parts of ion-exchange water, 294 parts of a 10% hydroxyapatite suspension liquid (SUPATAITO 10 manufactured by NIPPON CHEMICAL INDUSTRIAL CO., LTD.), and 0.2 parts of sodium dodecylbenzenesulfonate were uniformly dissolved and heated to 60 degrees C. The above-prepared toner material liquid was put in this beaker while being stirred with a TK HOMOMIXER at 12,000 rpm, and the stirring was continued for 10 minutes.

The resulting mixture was transferred to a flask equipped with a stirrer and a thermometer and heated to 98 degrees C. to remove the solvent, then subjected to filtration, washing, drying, and wind-power classification. Thus, a mother toner particle A was prepared.

Next, 100 parts of the mother toner particle A was mixed with 1.0 part of a hydrophobic silica and 1.0 part of a hydrophobic titanium oxide using a HENSCHEL MIXER. Thus, a toners A was prepared.

The particle diameter of the toner was measured using a particle size analyzer COULTER COUNTER TA-II (available from Beckman Coulter, Inc. (formerly Coulter Electronics)) with an aperture diameter of 100 μm. As a result, the toner A wad found to have a volume average particle diameter (Dv) of 6.2 μm and a number average particle diameter (Dn) of 5.1 μm.

Preparation of Carrier

Carrier Production Example 1

Core Material A

Mn—Mg—Sr ferrite having an internal void ratio of 1.9%, an apparent density of 2.0 g/cm$^3$, a surface roughness Rz of 2.5 μm, a σ1000 of 63 Am$^2$/kg, and an average particle diameter of 36 μm Composition of Resin Liquid 1

Acrylic resin solution (having a solid content concentration of 20% by mass): 200 parts by mass
Silicone resin solution (having a solid content concentration of 40% by mass): 2,000 parts by mass
Aminosilane (having a solid content concentration of 100% by mass): 30 parts by mass
Tungsten-oxide-doped tin oxide (having a powder resistivity of 40 Ω·cm): 1,200 parts by mass
Barium sulfate (having an average particle diameter of 0.4 μm): 650 parts by mass
Toluene: 6,000 parts by mass The above materials for the resin liquid 1 were subjected to a dispersion treatment using a HOMOMIXER for 10 minutes, thus obtaining a coating layer forming liquid.

The surface of the core material A was coated with the coating layer forming liquid (resin liquid 1) using a SPIRA COTA (manufactured by Okada Seiko Co., Ltd.) at a rate of 30 g/min in an atmosphere having a temperature of 55 degrees C., followed by drying, so that the thickness of the coating layer became 0.6 μm. The thickness of the resulting layer was adjusted by adjusting the amount of the resin liquid. The core particle having the coating layer thereon was burnt in an electric furnace at 150 degrees C. for 1 hour, then cooled, and pulverized with a sieve having an opening of 100 μm. Thus, a carrier 1 was prepared.

Carrier Production Example 2

Core Material B

Mn—Mg—Sr ferrite having an internal void ratio of 1.6%, an apparent density of 2.3 g/cm$^3$, a surface roughness Rz of 2.0 μm, a σ1000 of 63 Am$^2$/kg, and an average particle diameter of 36 μm A carrier 2 was prepared in the same manner as in Production Example 1 except for replacing the core material with the core material B.

Carrier Production Example 3

Core Material C

Mn—Mg—Sr ferrite having an internal void ratio of 2.1%, an apparent density of 2.2 g/cm$^3$, a surface roughness Rz of 1.8 μm, a σ1000 of 63 Am$^2$/kg, and an average particle diameter of 36 μm A carrier 3 was prepared in the same manner as in Production Example 1 except for replacing the core material with the core material C.

Carrier Production Example 4

Core Material D

Mn—Mg—Sr ferrite having an internal void ratio of 1.9%, an apparent density of 1.8 g/cm$^3$, a surface roughness Rz of 2.8 μm, a σ1000 of 63 $Am^2/kg$, and an average particle diameter of 36 μm A carrier 4 was prepared in the same manner as in Production Example 1 except for replacing the core material with the core material D.

Carrier Production Example 5

Core Material E

Mn—Mg—Sr ferrite having an internal void ratio of 0.7%, an apparent density of 2.5 $g/cm^3$, a surface roughness Rz of 1.6 μm, a σ1000 of 63 $Am^2/kg$, and an average particle diameter of A carrier 5 was prepared in the same manner as in Production Example 1 except for replacing the core material with the core material E.

Carrier Production Example 6

Core Material F

Mn—Mg—Sr ferrite having an internal void ratio of 1.4%, an apparent density of 2.2 $g/cm^3$, a surface roughness Rz of 2.4 μm, a σ1000 of 63 $Am^2/kg$, and an average particle diameter of 36 μm.

Composition of Resin Liquid 2

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 35 parts by mass Tungsten-oxide-doped tin oxide (having a powder resistivity of 40 Ω·cm): 1,200 parts by mass Toluene: 6,000 parts by mass A carrier 6 was prepared in the same manner as in Production Example 1 except for replacing the core material and the resin liquid with the core material F and the resin liquid 2, respectively.

Carrier Production Example 7

Composition of Resin Liquid 3

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Magnesium oxide (having an average particle diameter of 0.05 μm): 650 parts by mass Toluene: 6,000 parts by mass A carrier 7 was prepared in the same manner as in Production Example 6 except for replacing the resin liquid with the resin liquid 3.

Carrier Production Example 8

Composition of Resin Liquid 4

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Magnesium hydroxide (having an average particle diameter of 0.1 μm): 650 parts by mass Toluene: 6,000 parts by mass A carrier 8 was prepared in the same manner as in Production Example 6 except for replacing the resin liquid with the resin liquid 4.

Carrier Production Example 9

Composition of Resin Liquid 5

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Hydrotalcite (having an average particle diameter of 0.5 μm): 650 parts by mass Toluene: 6,000 parts by mass A carrier 9 was prepared in the same manner as in Production Example 6 except for replacing the resin liquid with the resin liquid 5.

Carrier Production Example 10

Composition of Resin Liquid 6

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Alumina (having an average particle diameter of 0.4 μm): 650 parts by mass Toluene: 6,000 parts by mass A carrier 10 was prepared in the same manner as in Production Example 6 except for replacing the resin liquid with the resin liquid 6.

Carrier Production Example 11

Composition of Resin Liquid 7

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 150 parts by mass Toluene: 6,000 parts by mass A carrier 11 was prepared in the same manner as in Production Example 6 except for replacing the resin liquid with the resin liquid 7.

Carrier Production Example 12

Core Material G

Mn ferrite having an internal void ratio of 0.5%, an apparent density of 2.2 $g/cm^3$, a surface roughness Rz of 2.3 μm, a σ1000 of 70 $Am^2/kg$, and an average particle diameter of 36 μm A carrier 12 was prepared in the same manner as in Production Example 1 except for replacing the core material with the core material G.

Carrier Production Example 13

Core Material H

Mn ferrite having an internal void ratio of 1.8%, an apparent density of 2.3 g/$cm^3$, a surface roughness Rz of 1.9 μm, a σ1000 of 70 $Am^2$/kg, and an average particle diameter of 36 μm μm A carrier 13 was prepared in the same manner as in Production Example 1 except for replacing the core material with the core material H.

Carrier Production Example 14

Core Material I

Mn ferrite having an internal void ratio of 1.7%, an apparent density of 2.2 g/$cm^3$, a surface roughness Rz of 2.1 μm, a σ1000 of 70 $Am^2$/kg, and an average particle diameter of 36 μm A carrier 14 was prepared in the same manner as in Production Example 1 except for replacing the core material with the core material I.

Carrier Production Example 15

Core Material J

Mn ferrite having an internal void ratio of 0.4%, an apparent density of 2.0 g/$cm^3$, a surface roughness Rz of 2.9 μm, a σ1000 of 70 $Am^2$/kg, and an average particle diameter of 36 μm A carrier 15 was prepared in the same manner as in Production Example 1 except for replacing the core material with the core material J.

Carrier Production Example 16

Core Material K

Mn ferrite having an internal void ratio of 0.3%, an apparent density of 2.0 g/$cm^3$, a surface roughness Rz of 3.1 μm, a σ1000 of 70 $Am^2$/kg, and an average particle diameter of 36 μm A carrier 16 was prepared in the same manner as in Production Example 1 except for replacing the core material with the core material K.

Carrier Production Example 17

Core Material L

Mn ferrite having an internal void ratio of 0.5%, an apparent density of 2.2 g/$cm^3$, a surface roughness Rz of 2.3 μm, a σ1000 of 65 $Am^2$/kg, and an average particle diameter of 36 μm A carrier 17 was prepared in the same manner as in Production Example 1 except for replacing the core material with the core material L.

Carrier Production Example 18

Core Material M

Mn ferrite having an internal void ratio of 0.5%, an apparent density of 2.2 g/$cm^3$, a surface roughness Rz of 2.3 μm, a σ1000 of 67 $Am^2$/kg, and an average particle diameter of 36 μm A carrier 18 was prepared in the same manner as in Production Example 1 except for replacing the core material with the core material M.

Carrier Production Example 19

Core Material N

Mn ferrite having an internal void ratio of 0.5%, an apparent density of 2.2 g/$cm^3$, a surface roughness Rz of 2.3 μm, a σ1000 of 74 $Am^2$/kg, and an average particle diameter of 36 μm A carrier 19 was prepared in the same manner as in Production Example 1 except for replacing the core material with the core material N.

Carrier Production Example 20

Core Material O

Mn ferrite having an internal void ratio of 0.5%, an apparent density of 2.2 g/$cm^3$, a surface roughness Rz of 2.3 μm, a σ1000 of 76 $Am^2$/kg, and an average particle diameter of 36 μm A carrier 20 was prepared in the same manner as in Production Example 1 except for replacing the core material with the core material O.

Carrier Production Example 21

Composition of Resin Liquid 8

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Indium-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass A carrier 21 was prepared in the same manner as in Production Example 12 except for replacing the resin liquid with the resin liquid 8.

Carrier Production Example 22

Composition of Resin Liquid 9

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Phosphorus-pentoxide-doped tin oxide (having a powder resistivity of 40 Ω·cm): 1,200 parts by mass Barium sulfate (having an average particle diameter of 0.4 μm): 650 parts by mass Toluene: 6,000 parts by mass A carrier 22 was prepared in the same manner as in Production Example 12 except for replacing the resin liquid with the resin liquid 9.

Carrier Production Example 23

Composition of Resin Liquid 10

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Carbon (Ketjen black): 900 parts by mass Barium sulfate (having an average particle diameter of 0.4 μm): 650 parts by mass Toluene: 6,000 parts by mass A carrier 23 was prepared in the same manner as in Production Example 12 except for replacing the resin liquid with the resin liquid 10.

Carrier Production Example 24

Composition of Resin Liquid 11

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Alumina surface-treated with tungsten-oxide-doped tin oxide (having a powder resistivity of 40 Ω·cm): 1,400 parts by mass Barium sulfate (having an average particle diameter of 0.4 μm): 650 parts by mass Toluene: 6,000 parts by mass A carrier 24 was prepared in the same manner as in Production Example 12 except for replacing the resin liquid with the resin liquid 11.

Details of the carriers prepared in Carrier Production Examples 1 to 24 are presented in Tables 1-1 and 1-2.

TABLE 1-1

| | | Core Material | | | | | |
|---|---|---|---|---|---|---|---|
| | | | Material | Internal Void Ratio (%) | Apparent Density ($g/cm^3$) | Surface Roughness Rz (μm) | Magnetization σ1000 ($Am^2/kg$) |
| Production Example 1 | Carrier 1 | Core Material A | Mn—Mg—Sr ferrite | 1.9 | 2.0 | 2.5 | 63 |
| Production Example 2 | Carrier 2 | Core Material B | Mn—Mg—Sr ferrite | 1.6 | 2.3 | 2.0 | 63 |
| Production Example 3 | Carrier 3 | Core Material C | Mn—Mg—Sr ferrite | 2.1 | 2.2 | 1.8 | 63 |
| Production Example 4 | Carrier 4 | Core Material D | Mn—Mg—Sr ferrite | 1.9 | 1.8 | 2.8 | 63 |
| Production Example 5 | Carrier 5 | Core Material E | Mn—Mg—Sr ferrite | 0.7 | 2.5 | 1.6 | 63 |
| Production Example 6 | Carrier 6 | Core Material F | Mn—Mg—Sr ferrite | 1.4 | 2.2 | 2.4 | 63 |
| Production Example 7 | Carrier 7 | Core Material F | Mn—Mg—Sr ferrite | 1.4 | 2.2 | 2.4 | 63 |
| Production Example 8 | Carrier 8 | Core Material F | Mn—Mg—Sr ferrite | 1.4 | 2.2 | 2.4 | 63 |
| Production Example 9 | Carrier 9 | Core Material F | Mn—Mg—Sr ferrite | 1.4 | 2.2 | 2.4 | 63 |
| Production Example 10 | Carrier 10 | Core Material F | Mn—Mg—Sr ferrite | 1.4 | 2.2 | 2.4 | 63 |
| Production Example 11 | Carrier 11 | Core Material F | Mn—Mg—Sr ferrite | 1.4 | 2.2 | 2.4 | 63 |
| Production Example 12 | Carrier 12 | Core Material G | Mn ferrite | 0.5 | 2.2 | 2.3 | 70 |
| Production Example 13 | Carrier 13 | Core Material H | Mn ferrite | 1.8 | 2.3 | 1.9 | 70 |
| Production Example 14 | Carrier 14 | Core Material I | Mn ferrite | 1.7 | 2.2 | 2.1 | 70 |
| Production Example 15 | Carrier 15 | Core Material J | Mn ferrite | 0.4 | 2.0 | 2.9 | 70 |
| Production Example 16 | Carrier 16 | Core Material K | Mn ferrite | 0.3 | 2.0 | 3.1 | 70 |
| Production Example 17 | Carrier 17 | Core Material L | Mn ferrite | 0.5 | 2.2 | 2.3 | 65 |
| Production Example 18 | Carrier 18 | Core Material M | Mn ferrite | 0.5 | 2.2 | 2.3 | 67 |
| Production Example 19 | Carrier 19 | Core Material N | Mn ferrite | 0.5 | 2.2 | 2.3 | 74 |
| Production Example 20 | Carrier 20 | Core Material O | Mn ferrite | 0.5 | 2.2 | 2.3 | 76 |
| Production Example 21 | Carrier 21 | Core Material G | Mn ferrite | 0.5 | 2.2 | 2.3 | 70 |
| Production Example 22 | Carrier 22 | Core Material G | Mn ferrite | 0.5 | 2.2 | 2.3 | 70 |
| Production Example 23 | Carrier 23 | Core Material G | Mn ferrite | 0.5 | 2.2 | 2.3 | 70 |
| Production Example 24 | Carrier 24 | Core Material G | Mn ferrite | 0.5 | 2.2 | 2.3 | 70 |

TABLE 1-2

| | | Formulation | | Carrier | | | |
|---|---|---|---|---|---|---|---|
| | | Chargeable Particle | Conductive Particle | Internal Void Ratio (%) | Apparent Density ($g/cm^3$) | Amount of Barium Exposure (atomic %) | Magnetization σ1000 ($Am^2/kg$) |
| Production Example 1 | Carrier 1 | Barium sulfate | Tungsten-oxide-doped tin oxide | 1.9 | 2.1 | 0.2 | 53 |
| Production Example 2 | Carrier 2 | Barium sulfate | Tungsten-oxide-doped tin oxide | 1.6 | 2.4 | 0.2 | 53 |
| Production Example 3 | Carrier 3 | Barium sulfate | Tungsten-oxide-doped tin oxide | 2.1 | 2.3 | 0.2 | 53 |
| Production Example 4 | Carrier 4 | Barium sulfate | Tungsten-oxide-doped tin oxide | 1.9 | 1.9 | 0.2 | 53 |
| Production Example 5 | Carrier 5 | Barium sulfate | Tungsten-oxide-doped tin oxide | 0.7 | 2.6 | 0.2 | 53 |
| Production Example 6 | Carrier 6 | None | Tungsten-oxide-doped tin oxide | 1.4 | 2.2 | — | 53 |
| Production Example 7 | Carrier 7 | Magnesium oxide | Tungsten-oxide-doped tin oxide | 1.4 | 2.3 | — | 53 |
| Production Example 8 | Carrier 8 | Magnesium hydroxide | Tungsten-oxide-doped tin oxide | 1.4 | 2.3 | — | 53 |
| Production Example 9 | Carrier 9 | Hydrotalcite | Tungsten-oxide-doped tin oxide | 1.4 | 2.3 | — | 53 |
| Production Example 10 | Carrier 10 | Alumina | Tungsten-oxide-doped tin oxide | 1.4 | 2.3 | — | 53 |
| Production Example 11 | Carrier 11 | Barium sulfate | Tungsten-oxide-doped tin oxide | 1.4 | 2.3 | 0.03 | 53 |
| Production Example 12 | Carrier 12 | Barium sulfate | Tungsten-oxide-doped tin oxide | 0.5 | 2.3 | 0.2 | 63 |
| Production Example 13 | Carrier 13 | Barium sulfate | Tungsten-oxide-doped tin oxide | 1.8 | 2.4 | 0.2 | 63 |
| Production Example 14 | Carrier 14 | Barium sulfate | Tungsten-oxide-doped tin oxide | 1.7 | 2.3 | 0.2 | 63 |
| Production Example 15 | Carrier 15 | Barium sulfate | Tungsten-oxide-doped tin oxide | 0.4 | 2.1 | 0.2 | 63 |
| Production Example 16 | Carrier 16 | Barium sulfate | Tungsten-oxide-doped tin oxide | 0.3 | 2.1 | 0.2 | 63 |
| Production Example 17 | Carrier 17 | Barium sulfate | Tungsten-oxide-doped tin oxide | 0.5 | 2.3 | 0.2 | 55 |
| Production Example 18 | Carrier 18 | Barium sulfate | Tungsten-oxide-doped tin oxide | 0.5 | 2.3 | 0.2 | 57 |
| Production Example 19 | Carrier 19 | Barium sulfate | Tungsten-oxide-doped tin oxide | 0.5 | 2.3 | 0.2 | 72 |
| Production Example 20 | Carrier 20 | Barium sulfate | Tungsten-oxide-doped tin oxide | 0.5 | 2.3 | 0.2 | 74 |
| Production Example 21 | Carrier 21 | Barium sulfate | Indium-oxide-doped tin oxide | 0.5 | 2.3 | 0.2 | 63 |
| Production Example 22 | Carrier 22 | Barium sulfate | Phosphorus-pentoxide-doped tin oxide | 0.5 | 2.3 | 0.2 | 63 |

TABLE 1-2-continued

| | | Formulation | | Carrier | | | |
|---|---|---|---|---|---|---|---|
| | | Chargeable Particle | Conductive Particle | Internal Void Ratio (%) | Apparent Density ($g/cm^3$) | Amount of Barium Exposure (atomic %) | Magnetization σ1000 ($Am^2/kg$) |
| Production Example 23 | Carrier 23 | Barium sulfate | Carbon black | 0.5 | 2.3 | 0.2 | 63 |
| Production Example 24 | Carrier 24 | Barium sulfate | Alumina surface-treated with tungsten-oxide-doped tin oxide | 0.5 | 2.3 | 0.2 | 63 |

EXAMPLES

Example 1

A developer 1 was prepared by stir-mixing 7 parts by mass of the toner A prepared in Toner Production Example and 93 parts by mass of the carrier 1 prepared in Carrier Production Example 1 using a mixer for 10 minutes.

The developer was set in a commercially-available digital full-color printer (IMAGIO MP C6004SP manufactured by Ricoh Co., Ltd.), and the initial developer was subjected to evaluations. Next, a text chart having an image area ratio of 5% was output on 50,000 sheets and then an image chart having an image area ratio of 20% was output on 50,000 sheets, i.e., images were output on 100,000 sheets in total, then the developer (hereinafter "developer over time") was subjected to evaluations.

Amount of Decrease of Charge

The amount of decrease of charge before and after the image output on 100,000 sheets was evaluated.

First, 93% by mass of the initial carrier and 7% by mass of the toner were mixed to prepare a triboelectrically-charged sample (hereinafter "initial developer"). The amount of charge of the sample was measured by a general blow-off method (using TB-200 manufactured by Toshiba Chemical Corporation), and this measured amount was defined as an initial amount of charge. Next, the toner was removed from the developer by the blow-off device after the image output. In the same manner as described above, 93% by mass of the resulted carrier and 7% by mass of the fresh toner were mixed to prepare another triboelectrically-charged sample, and this sample was subjected to the measurement of the amount of charge. The difference between the measured amount of charge and the initial amount of charge was defined as the amount of decrease of charge. The targeted amount of decrease of charge is less than 10 μC/g.

Ghost Image

A solid image was output with the initial developer. The difference in image density between a tip portion of the image and a portion behind the tip portion by a distance equivalent to the peripheral length of the developing roller was visually observed to evaluate the degree of generation of ghost images according to the following criteria.

A+: Very good, A: Good, B: Acceptable, C: Unacceptable for practical use

White Spots (Carrier Deposition)

Using each of the initial developer and the developer over time, a solid image and an image of a 2-dot line (100 lpi/inch) pattern in the sub-scanning direction were each output on an A3-size paper sheet. The number of white spots generated by carrier particles deposited on the solid image and between the lines of the 2-dot line pattern was measured by visual observation and ranked according to the following criteria.

A+: Very good, A: Good, B: Acceptable, C: Unacceptable for practical use

Vertical-Stripe-Like Abnormal Image

The printer was tilted 1° toward the front side, and a solid image was output with the initial developer. The resulted vertical-stripe-like abnormal image was visually observed and ranked according to the following criteria.

A: Good, B: Acceptable, C: Unacceptable for practical use

Color Contamination

A solid image was output with each of the initial developer and the developer after the image output on 100,000 sheets (i.e., developer over time) and subjected to a measurement using an instrument X-RITE.

Specifically, values (L0*, a0*, b0*, and ID) of a solid image output with the initial developer and values (L1*, a1*, b1*, and ID') output after the image output on 100,000 sheets were measured using an X-RITE 938 D50 (available from X-Rite Inc.), and ΔE was calculated by the following formula. The degree of color contamination was ranked based on ΔE according to the following criteria.

$$\text{Color difference } \Delta E=\{(L0^*-L1^*)^2+(a0^*-a1^*)^2+(b0^*-b1^*)^2\}^{1/2}$$

L0*, a0*, and b0*: Measured values for the initial developer

L1*, a1*, and b1*: Measured values after the image output on 100,000 sheets

A: ΔE≤2

B: 2<ΔE≤6

C: 6<ΔE

Ranks A and B are acceptable.

Examples 2 to 20 and Comparative Examples 1 to 4

The evaluations were performed in the same manner as in Example 1 except for replacing the developer with each of the developers 2 to 24 using the respective carriers 2 to 24. The evaluation results are presented in Table 2.

TABLE 2

| | Carrier | Amount of Decrease of Charge (μC/g) | Ghost Image (Rank) | Carrier Deposition Initial Developer (Rank) | Carrier Deposition Developer Over Time (Rank) | Vertical-stripe-like Abnormal Image (Rank) | Color Contamination (Rank) |
|---|---|---|---|---|---|---|---|
| Example 1 | Carrier 1 | 6 | A+ | B | B | A | A |
| Example 2 | Carrier 2 | 6 | B | A | A | A | A |
| Comparative Example 1 | Carrier 3 | 10 | A | C | C | A | A |
| Comparative Example 2 | Carrier 4 | 5 | A+ | C | C | A | A |
| Comparative Example 3 | Carrier 5 | 11 | C | A | A | A | A |
| Comparative Example 4 | Carrier 6 | 16 | A | A | B | A | A |
| Example 3 | Carrier 7 | 7 | A | B | B | A | A |
| Example 4 | Carrier 8 | 7 | A | B | B | A | A |
| Example 5 | Carrier 9 | 7 | A | B | B | A | A |
| Example 6 | Carrier 10 | 8 | A | B | B | A | A |
| Example 7 | Carrier 11 | 9 | A | B | B | A | A |
| Example 8 | Carrier 12 | 5 | A | A+ | A+ | A | A |
| Example 9 | Carrier 13 | 7 | B | A | A | A | A |
| Example 10 | Carrier 14 | 5 | A | A | A | A | A |
| Example 11 | Carrier 15 | 5 | A+ | A+ | A | A | A |
| Example 12 | Carrier 16 | 5 | A+ | A+ | B | A | A |
| Example 13 | Carrier 17 | 6 | A | A | A | A | A |
| Example 14 | Carrier 18 | 6 | A | A+ | A+ | A | A |
| Example 15 | Carrier 19 | 4 | A | A+ | A+ | A | A |
| Example 16 | Carrier 20 | 4 | A | A+ | A+ | B | A |
| Example 17 | Carrier 21 | 5 | A | A+ | A+ | A | A |
| Example 18 | Carrier 22 | 5 | A | A+ | A+ | A | A |
| Example 19 | Carrier 23 | 6 | A | A+ | A | A | B |
| Example 20 | Carrier 24 | 5 | A | A+ | A+ | A | A |

It is clear from the results in Table 2 that each Example has delivered good results in evaluating the above-described properties, i.e., "amount of decrease of charge", "white spots (carrier deposition)", "vertical-stripe-like abnormal image", and "color contamination". By contrast, each Comparative Example were not able to achieve all of these properties at the same time.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST

20 Photoconductor
32 Charger
40 Developing device
61 Cleaner

The invention claimed is:

1. A carrier for forming an electrophotographic image, comprising:

a core particle; and a coating layer coating the core particle, the coating layer containing a chargeable particle, wherein the carrier has an internal void ratio of 0.0% or greater but less than 2.0% and an apparent density of 2.0 g/cm$^3$ or greater but less than 2.5 g/cm$^3$.

2. The carrier according to claim 1, wherein the chargeable particle comprises at least one member selected from the group consisting of barium sulfate, zinc oxide, magnesium oxide, magnesium hydroxide, and hydrotalcite.

3. The carrier according to claim 1, wherein the chargeable particle comprises barium sulfate, and an amount of barium exposed at a surface of the coating layer is 0.1% by atom or greater.

4. The carrier according to claim 1, wherein the core particle comprises manganese ferrite.

5. The carrier according to claim 1, wherein the core particle has a surface roughness Rz of 2.0 μm or greater but less than 3.0 μm.

6. The carrier according to claim 1, wherein the carrier has a magnetization of 56 Am$^2$/kg or greater but less than 73 Am$^2$/kg in a magnetic field of 1,000 Oe that is equal to 79.58 kA/m.

7. The carrier according to claim 1, wherein the coating layer further contains an inorganic particle, wherein the inorganic particle comprises at least one member selected from the group consisting of:

a particle of a doped tin oxide doped with at least one member selected from the group consisting of tungsten, indium, phosphorus, tungsten oxides, indium oxides, and phosphorus oxides; and a particle comprising a base particle and the doped tin oxide on a surface of the base particle.

8. A developer for forming an electrophotographic image comprising the carrier according to claim 1.

9. An electrophotographic image forming method, comprising:

forming an electrostatic latent image on an electrostatic latent image bearer;

developing the electrostatic latent image formed on the electrostatic latent image bearer with the developer according to claim 8 to form a toner image;

transferring the toner image formed on the electrostatic latent image bearer onto a recording medium; and fixing the toner image on the recording medium.

10. An electrophotographic image forming apparatus, comprising:

an electrostatic latent image bearer;

a charger configured to charge the electrostatic latent image bearer;

an irradiator configured to form an electrostatic latent image on the electrostatic latent image bearer;

a developing device containing the developer according to claim 8, the developing device configured to develop the electrostatic latent image formed on the electrostatic latent image bearer with the developer to form a toner image;

a transfer device configured to transfer the toner image formed on the electrostatic latent image bearer onto a recording medium; and a fixing device configured to fix the toner image on the recording medium.

11. A process cartridge detachably mountable on an image forming apparatus, comprising:

an electrostatic latent image bearer;

a charger configured to charge the electrostatic latent image bearer;

a developing device containing the developer according to claim 8, the developing device configured to develop the electrostatic latent image formed on the electrostatic latent image bearer with the developer to form a toner image; and a cleaner configured to clean the electrostatic latent image bearer.

12. The carrier of claim 1, wherein the chargeable particle comprises barium sulfate and the amount of barium exposed at the surface of the coating layer is 0.03% by atom or more and 0.2% by atom or less.

13. The carrier of claim 1, wherein the carrier has an apparent density of 2.0 $g/cm^3$ or greater but less than 2.3 $g/cm^3$.

14. The carrier of claim 1, wherein the carrier has an internal void ratio of 0.0% or greater but less than 1.9%.

15. The carrier of claim 1, wherein the carrier has an internal void ratio of 0.0% or greater but less than 1.9% and an apparent density of 2.0 $g/cm^3$ or greater but less than 2.3 $g/cm^3$.

* * * * *